Figure 1:
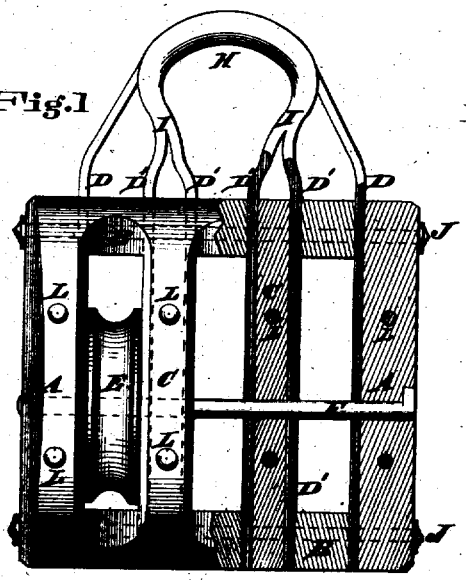

J. F. HARCOURT.

TACKLE-BLOCK.

No. 7,728. Reissued June 12, 1877.

Attest

Edgar J. Jones

John E. Jones

Inventor

Joseph F. Harcourt

By F. Millard

Atty.

N. PETERS, PHOTO-LITHOGRAPHER, WASHINGTON, D. C.

UNITED STATES PATENT OFFICE

JOSEPH F. HARCOURT, OF CINCINNATI, OHIO.

IMPROVEMENT IN TACKLE-BLOCKS.

Specification forming part of Letters Patent No. 78,663, dated June 9, 1868; reissue No. 7,728, dated June 12, 1877; application filed September 25, 1876.

*To all whom it may concern:*

Be it known that I, JOSEPH F. HARCOURT, of Cincinnati, Hamilton county, State of Ohio, have invented a certain new and useful Improvement in Sheave or Tackle Blocks, of which the following is a specification:

My invention is an improvement in the class of iron-strapped tackle-blocks having two or more sheaves.

This class of blocks, as heretofore constructed, have been deficient in strength and durability of the shell or frame into which are inserted the straps, sheaves, and pins, said shell or frame being the foundation proper of the block, protecting, as it does, the sheaves from fracture and the rope from being chafed or cut when in use, and resisting heavy strains.

When the partitions separating the sheaves, as heretofore constructed, have been in three parts of equal thickness, two of wood (one on each side of the middle strap) and the other (the strap itself) of iron, the three combined form the partition; and the straps are from three-eighths to one inch in thickness, and vary in width according to strength required; but the wood parts of the partition are no thicker than the strap of iron or middle part, and, therefore, are easily broken when subjected to rough usage, or, when under heavy strain, they come in contact with any immovable object, resulting in fracture of the edges of the sheaves, cutting and chafing the rope, and often letting the weight suspended fall, thereby causing great damage and loss of time, as well as being unsafe and unreliable for heavy work.

My improvement overcomes the deficiency of strength, liability to breakage and accident, as the partitions separating the sheaves are of wood, of any desired thickness above that of the straps, and fitted with grooves for the reception and retention of the iron straps, sufficient space of wood remaining beyond the thickness of strap for the passage of rivets to secure additional strength, and thus make a shell or frame that will withstand any usage that blocks are applied to, where, in many instances, the partitions are required to stand very heavy direct pressure, as well as severe torsional strains.

My invention consists, first, in forming the partitions between the sheaves of combined iron strap and wood, the latter being grooved to receive the former, so that, while great width of wood, and consequent stiffness, is given to the partitions, the necessity for mortising the partitions to receive the straps is avoided; second, in making the grooves in the partitions for the straps, one on each side of said partitions, for the purpose of bringing the metallic part of the partition in immediate proximity to the faces of the sheaves, to avoid the risk of the bending of the axle or pin in use; third, in making each partition not only with grooves at the side faces thereof, but with one piece of wood, unbroken or uncut from side to side, so that the partition has great rigidity and strength; fourth, in forming the eye of the block into two separated straps, which so enter the partition as to leave a thickness of wood between them, and occupy a position in close contact with the side faces of the sheave-wheels, to avoid adding weight of metal to secure thick partitions.

Figure 2:
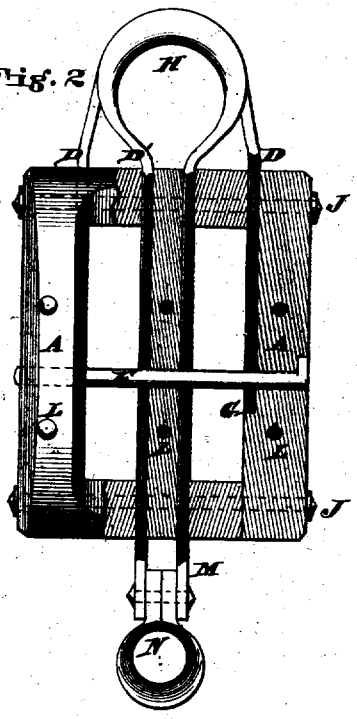
Figure 3:
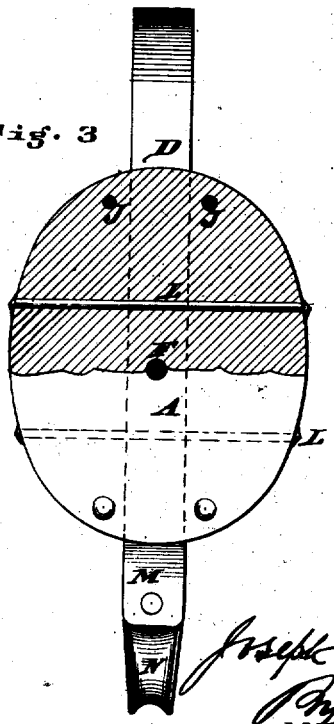
Figure 4:
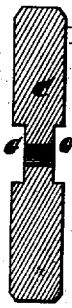

Figure 1 is a partly-sectioned front elevation of a triple sheave-block embodying my improvements. Fig. 2 is a similar view of a double sheave-block. Fig. 3 is a partly-sectioned side elevation of my improved block for two or more sheaves. Fig. 4 is a cross-section of one of the partitions detached.

The wooden portion of my frame-work or block proper consists of the usual number of cheeks or sides A, partitions C, and end pieces B. The straps D D′ are broad in the direction parallel with the faces of the sheaves E, and thin in the plane of the pin or axle F, and are let into grooves G G′. This provision of grooves in the partitions enables the partitions to be made as much thicker than the strap as is necessary or desirable, without having to resort to the process of mortising, so that while I am enabled to avoid the objectionable manufacture of blocks in which the partitions are of the same thickness as the strap, and possessing no grooves to receive and sustain the straps, I do not have to make the receptacles for the straps by the expensive and difficult operation of mortising. I prefer that the wood of which the partitions are formed shall be in one piece from side to side, for the purpose of giving them great rigidity, and I therefore make the grooves G G′ in the sides of the partitions; and this location also gives another advantage in construction. It brings the faces of the straps against the faces of the sheaves, leaving no wood between, which might yield and allow the pin to be bent or broken in use. The eye H for the insertion of the hook or cordage lashing is preferably bent into two of the straps D′, as at Fig. 2, or bent and forked, as at I, Fig. 1, into two on each side, and in either case entering the grooves, so as to leave wood between them, and thus give metallic bearing-surfaces for the pin of the sheaves of great width apart. The middle or inside strap for a two-sheave block is formed with an eye for the reception of the hook or ring, also for the reception of the outside strap. The inner strap is clinched over the outer strap, the straps thus combined forming a complete strap for a two-sheave block, the whole being inserted in the shell in the manner described and shown. The ends of the middle or inside strap pass through the grooves G G′ in the partitions, where they make a part of the same, and occupy a position flush with the face of the wood partition, in close proximity to the faces of the sheaves, giving effectual support to the pin which passes through the straps and sheaves, upon which (the support of the pin) depends the safety and success of this class of blocks. The middle or inside strap for a three-sheave block is formed with an eye by uniting two pieces of iron of the proper size a sufficient length to form said eye for hook or ring, also for the reception of the outside strap, the straps thus combined, as shown, forming a complete strap device for a three-sheave block, the whole being inserted in the shell, the ends of the middle or inside strap passing through the grooves in the partitions making a part of them, as described for a two-sheave block. The main rivets J pass from side to side entirely through the cheeks, partitions, and end pieces, but are not, as in other inside strap-blocks, the only means of junction of these parts, when each partition, as well as cheek, is in one unbroken piece; and, furthermore, the partitions, being so much wider than the metal of the straps, are susceptible of being secured by cross or counter rivets L, which may be passed entirely through each cheek and partition, from edge to edge, without interfering with the straps. The central strap may, when required, be extended down, as at M, for the attachment of a becket, N.

I claim herein as new and of my invention—

1. An inside iron strap-block constructed with a wooden partition, in which the intermediate metal strapping is embedded, the thickness of the wooden partition being in excess of the thickness of the said metal strapping, substantially as and for the purpose specified.

2. In a two or more sheave block, the partitions C, provided with grooves G G′ in the sides, the depth of the grooves being at least equal to the thickness of the strap, but not extending entirely through the partition, substantially as specified.

3. In a two or more sheave block, the partitions C, extending in one piece from side to side of the block, and provided with grooves G G′ in the sides, the depth of the grooves being at least equal to the thickness of the strap, but not extending entirely through the partition, substantially as specified.

4. The eye H, ending in forks or straps D′, separated in passing through the partitions, substantially as and for the purpose specified.

In testimony of which invention I hereunto set my hand.

JOSEPH F. HARCOURT.

Witnesses:
JOHN E. JONES,
F. MILLWARD.